Figure 6:
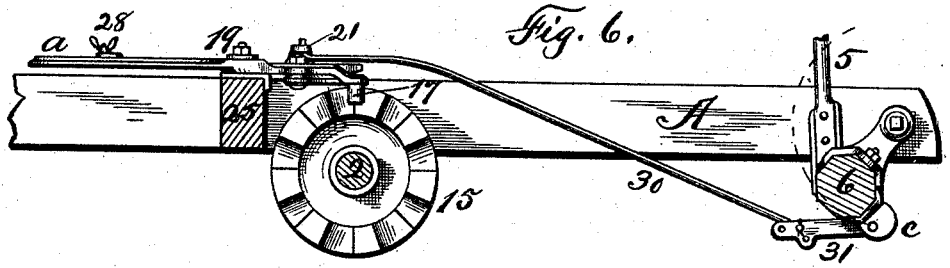

(No Model.)　　　　　　　E. D. MEAD.　　　　3 Sheets—Sheet 1.
SEEDER.
No. 492,358.　　　　　　　　　　　Patented Feb. 21, 1893.
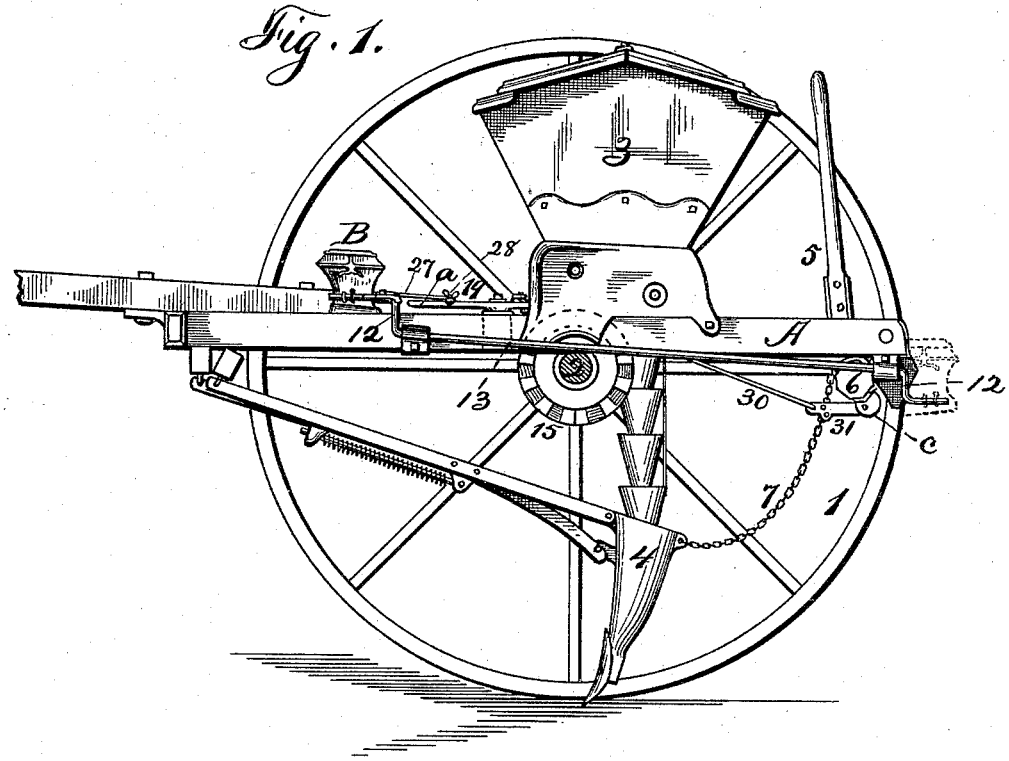
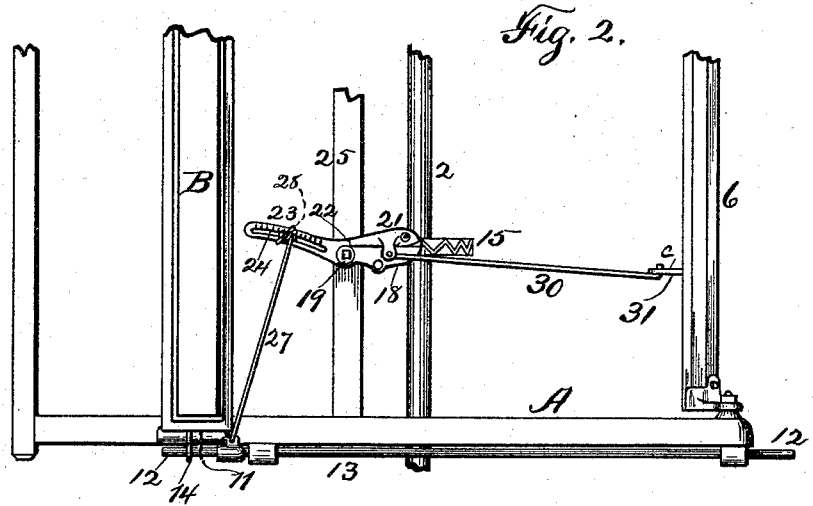
WITNESSES:　　　　　　　　　　　　　　　　　　INVENTOR
Geo. M. Blivens.
C. B. Kinne.　　　　　　　　By Smith & Denison
　　　　　　　　　　　　　　　his ATTORNEYS.

(No Model.) 3 Sheets—Sheet 2.
E. D. MEAD.
SEEDER.
No. 492,358. Patented Feb. 21, 1893.
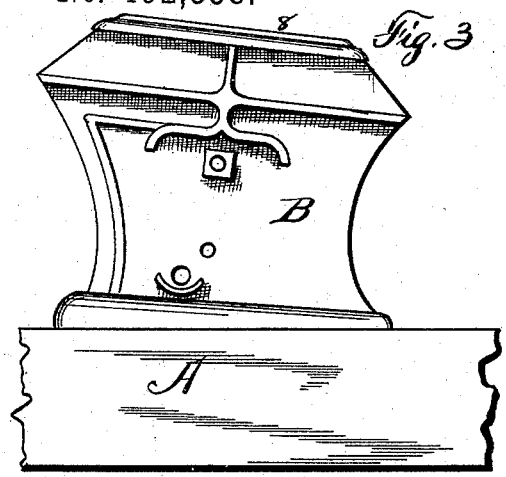
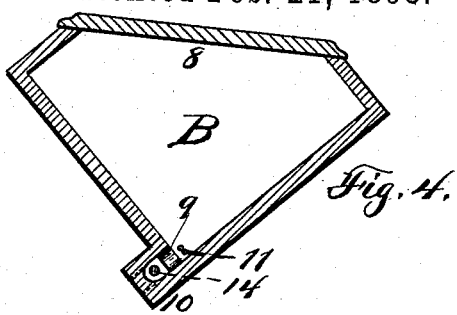
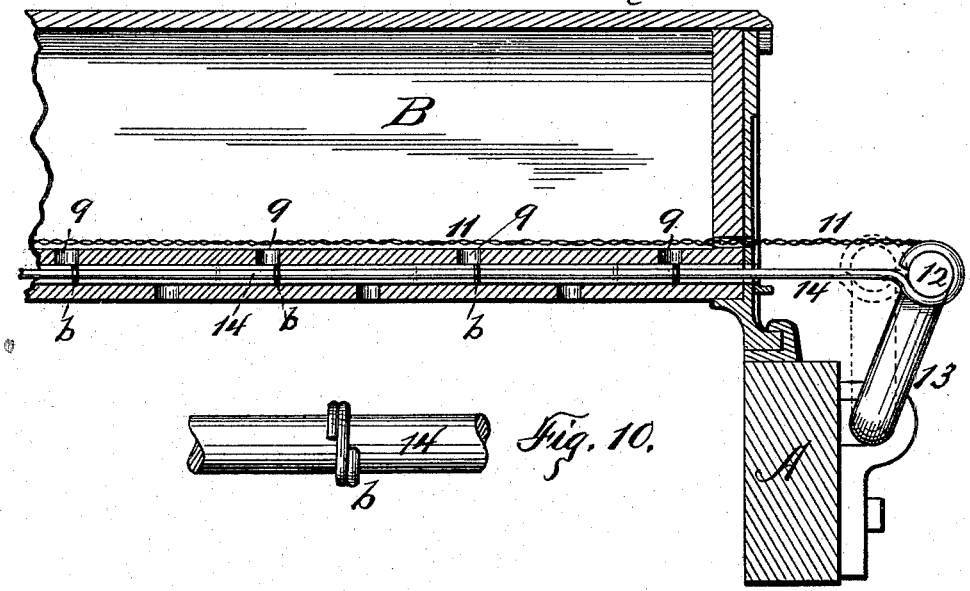
WITNESSES:
INVENTOR
ATTORNEYS.

(No Model.) 3 Sheets—Sheet 3.

E. D. MEAD.
SEEDER.

No. 492,358. Patented Feb. 21, 1893.

WITNESSES:
H. A. Carhart.
Geo. M. Blower

INVENTOR
Edwin D. Mead
By Smith & Denison
his ATTORNEYS.

UNITED STATES PATENT OFFICE.

EDWIN DANIEL MEAD, OF PHELPS, NEW YORK, ASSIGNOR TO THE CROWN MANUFACTURING COMPANY, OF NEW YORK.

SEEDER.

SPECIFICATION forming part of Letters Patent No. 492,358, dated February 21, 1893.

Application filed September 12, 1892. Serial No. 445,600. (No model.)

*To all whom it may concern:*

Be it known that I, EDWIN DANIEL MEAD, of Phelps, in the county of Ontario, in the State of New York, have invented new and useful Improvements in Seeders, of which the following, taken in connection with the accompanying drawings, is a full, clear, and exact description.

My invention relates to apparatus for sowing grass, flax or other small seeds, by means of a vibratory mechanism connected to the seed hopper, by means of which the seed is automatically fed from the hopper into a receiver, and is thence discharged evenly and uniformly; said hopper being supported or carried by the wheel of a grain drill, or a wheelbarrow.

My object is to insure an even and uniform feed and discharge by means of a reciprocating or vibratory mechanism, connected to an actuating cam driven by the rotation of one of the wheels of a grain-drill (for instance) and consisting of a crank shaft, or rock shaft having a crank arm upon each end, to one of which crank arms, the stirring member of the feed mechanism is connected and which passes through the hopper adjacent to the apex of its angular bottom, and the other member of which passes through a trough-shaped receiver under and receiving the seed from the hopper through a series of holes in the angle of the hopper bottom, said trough being provided with a series of holes arranged alternately with relation to those in the hopper bottom; said stirring member consisting of a chain or analogous roughened, or rough faced device, drawn back and forth through the seed and said second or discharging member consisting of a cord, or a flat, round, rectangular, or oval rod or cable provided at suitable intervals with a bunch, ridge, collar, washer, knot or other suitable projection, either wholly or partially surrounding said cord or rod, and adapted to so fit the concavity of the trough as to operate as a scraper, when said cord or rod is reciprocated, to pull, carry or draw the seed along in said trough, away from the holes in the hopper bottom, and toward the discharge openings in said trough with each vibration, said hopper being adapted to be placed upon a drill, either in front or rear of the drill spouts, and the feed mechanism being adapted to give an even, uniform and positive force feed, of the seed, whether it is fed alone, or is mixed with any fuzzy or other substance. In the following it is only described as attached to a seed-drill, though it is capable of being attached to any trundling device or mechanism.

My invention consists in the foregoing and the other novel features of construction and operation hereinafter described, and which are specifically set forth in the claims hereunto annexed.

Figure 7:
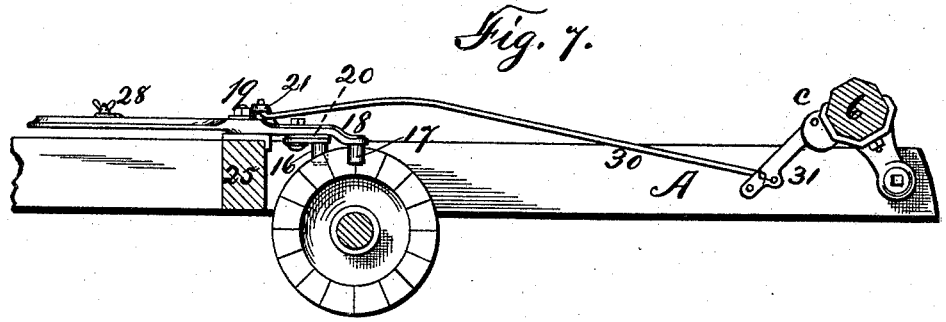
Figure 8:
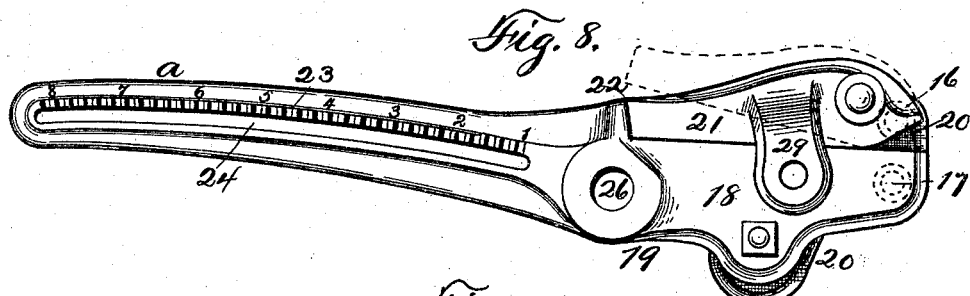
Figure 9:
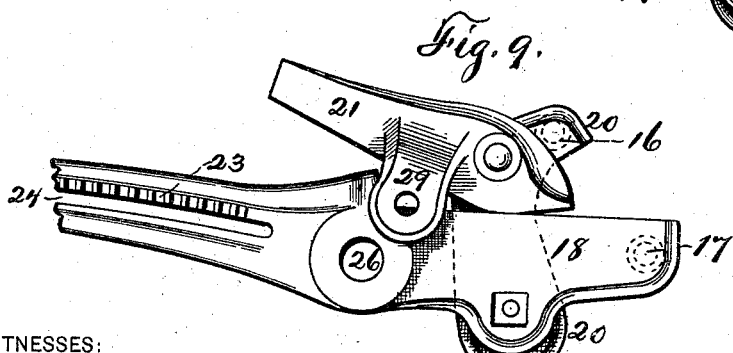

It is constructed as follows, reference being had to the accompanying drawings, in which Figure 1 is a side elevation of a grain-drill, with one wheel removed, to which my seed-hopper mechanism is shown in front of the grain box, in full lines, and by dotted lines at the rear. Fig. 2, is a top plan of part of the drill frame, showing the feed-adjusting mechanism, and part of the seed hopper, the grain box being removed. Fig. 3, is an end elevation of the seed hopper, without the feed and stirring mechanism. Fig. 4, is a transverse section of the same, and of the stirring and feeding or discharging members within it, or in the receiving trough below it. Fig. 5, is a longitudinal sectional elevation of part of the seed hopper and trough, the stirring and seed discharging devices, and one of the rock or crank shafts to which said devices are connected. Fig. 6, is a sectional elevation of part of the frame, the cam part of the vibratory mechanism operated by it, and the connections by which the feed is stopped or started, the parts being in position to feed the seed. Fig. 7, is a like view of the same parts in the position they assume when the feed is stopped. Fig. 8, is a top plan view of the combined vibrator and feed-gage, as in position to feed the seed. Fig. 9, is a like view of part of the same, showing them as when the feed is stopped. Fig. 10 is a portion of the feed-rod showing one of the enlargements.

A—, is the main frame carried by the wheels —1—, secured upon the axle —2—; and —3— is the grain box mounted upon the frame and connected to the spouts —4— by any ordinary means, said spouts being constructed and mounted so as to be adapted to perform all the functions commonly appertaining to them, and to be raised or lowered, as by the lever —5— connected to and adapted to rotate the shaft —6— to wind or unwind the chain —7—; but as these parts are not part of this invention, I make no further description thereof.

B—, is the hopper in which the grass, flax or other seed is placed, of substantially the form shown in the drawings, having a cover —8— and a downwardly inclined or converging bottom, one side thereof being provided with a series of equi-distant feed holes —9—, at or near the apex of the angle of their junction; and —10— is a trough below the hopper, and under the feed holes —9—, so as to receive the seed which flows or is fed through them, said trough being provided with a series of equi-distant discharge openings arranged in alternation with the feed holes. This trough may be of any shape desired, in cross section, and extends the whole length of the seed hopper.

A vibrating or reciprocating agitator or stirrer —11— is placed in the hopper adjacent to the apex of the bottom and the feed holes therein, and though shown as a chain or twisted wire, may be of any other form adapted to perform the functions requisite to it, and it passes through the ends of the hopper, and is connected to the crank arm —12— of the shaft —13— which is mounted in suitable bearings upon the side of the main frame, there being such a shaft on each side, where a flexible stirrer is used, only one being necessary when it has sufficient rigidity or stiffness to stand the longitudinal pushing in through the hopper, after having been drawn outward. In the trough —10— I also place a feed-rod —14— of any shape desired, in cross section, or it may be a cord or other flexible body, and it is provided at suitable intervals with a series of bunches, enlargements, ridges, collars, washers, knots or other suitable projections —b—, adapted to properly fit in the concavity of the trough, and to operate as scrapers when the rod or cord is reciprocated by the vibration or rocking of the crank arm —12—, to which it is connected after passing through the end of said trough, to pull, carry or draw the seed along in said trough, which has entered it through the feed holes —9—, to the discharge openings in the trough, whence it falls to the ground.

As shown, the seed hopper may be either in front or rear of the drill spouts, the crank shaft being provided with a crank arm upon each end, so that the hopper can be shifted at any time desired.

Upon the axle I secure the double faced cam —15—, the alternating cam faces being of substantially the form shown in Fig. 2; and —16— and —17— are friction rollers in engagement with the opposite cam faces, and so arranged that when one roller is at the bottom of one cam recess, the other is at the apex of the angle between two of the recesses. These rollers are mounted upon suitable studs, or pins, downwardly projecting, the one from the arm —18— of the vibrator —19—; and the other from the swinging jaw —20—, pivotally connected to said vibrator; and —21— is a dog pivoted upon said jaw, and adapted to swing therewith and thereon, and having one end rounded, as shown, and bearing upon the side of the vibrator, and having its other end adapted to engage with the shoulder —22—, and when in such engagement holding both rollers in operative connection with both faces of said cam. This vibrator comprises the arm —18—, the jaw —20—, the dog —21— and said pins and rollers, and also the feed gage —a— provided with the scale —23— and the longitudinal slot —24—, and is pivotally mounted upon the cross beam —25— by a pin or bolt through the hole —26—, and the rotation of the cam, laterally, vibrates it upon its pivot, when both rollers are in such engagement. A vibration rod —27— is connected at one end to the crank arm —12— and at the other end is connected to a nut mounted and adapted to slide in the slotway —24— for adjustment, and said nut is secured at any desired position by the thumb-screw —28—, and by such adjustment the vibration of the vibrator, the rod, the crank arm, the stirrer and the feed rod is regulated.

The dog —21— is provided with an ear —29— to which the rod —30— is connected, its other end being hooked into the connecting rod —31—, which is pivotally connected to a stud c projecting from the shaft —6—, so that when the lever —5— is thrown back, rotating the shaft to the right, in Figs. 1 or 6, then the swing of the rod —31— and the forward movement of the rod —30— swings the dog —21— upon its pivot, out of engagement with the shoulder —22— and then the jaw —20— is swung upon its pivot throwing the roller —16— out of engagement with the cam, and this stops the vibration, because then when the roller —17— passes the apex between two cam recesses, it will no longer follow the cam face, but remains out of engagement therewith, until, when the shaft is rotated forward, and the jaw and its roller are drawn back into re-engagement as aforesaid, and the dog is in renewed engagement with said shoulder.

In Fig. 10 I show a wire —b— coiled around the feed rod as one method of creating the enlargements thereon, which operate as scrapers to force the seed to the discharge openings.

What I claim as my invention, and desire to secure by Letters Patent, is—

1. In a seeder, the combination with a rotating cam, of a vibrator consisting of a pivoted body, an arm having a friction roller, a swinging jaw having a friction roller, said rollers engaging with said cam, and a dog pivoted upon said vibrator locking said jaw in its engagement, and means to shift the dog and jaw out of such engagement.

2. A vibrator pivotally mounted, a cam engaging with one end of it, a dog pivoted upon said vibrator and locking it in such engagement, a gage scale upon its other end, a vibrating rod connected adjustably to the vibrator, and to a crank shaft, a crank-shaft, a stirrer and a feed rod connected thereto, and a perforated seed hopper receiving said stirrer and having a seed trough, perforated, and in which the feed rod reciprocates.

3. In a seeder a vibratory and rigid feed rod comprising a rod enlarged at intervals and having the intervening portions of normal size, in combination with a seed trough having its bottom perforated at intervals, and a feed box above it, having its bottom perforated in alternation with the perforations in said trough.

4. In a seeder, the combination with the rotating cam, of a pivotally mounted vibrator having an arm and a swinging jaw pivotally mounted on said arm, and rollers on said arm and jaw, detachably engaging with the faces of said cam.

5. In a seeder, the combination with the rotating cam, of a pivotally mounted vibrator having an arm and a swinging jaw pivotally mounted on one end, and a combined feed gage and scale upon the other end, and rollers upon said arm and jaw, detachably engaging with the faces of said cam.

6. The combination with the pivotally mounted vibrator body having a feed gage and scale on one end, and an arm carrying a roller on the other end, of a jaw pivotally mounted upon said body and adapted to swing toward or away from said arm and provided with a roller.

7. The combination with the pivotally mounted vibrator body having a feed gage and scale on one end, and arm carrying a roller upon the other end, and a jaw pivoted upon said body and adapted to swing toward or away from said arm and provided with a roller, and a dog pivoted upon said jaw and detachably engaging with a shoulder upon said body.

8. The combination with the rotating cam, of a pivotally mounted vibrator having a combined feed gage and scale on one end, an arm on the other end, a jaw pivoted upon said body and adapted to swing thereon, rollers upon said arm and jaw, detachably engaging with said cam, and a dog pivoted upon said jaw and detachably engaging with a shoulder upon said vibrator body.

9. In a seeder, a vibratory and rigid free rod, comprising a rod enlarged at intervals, and having the intervening portions of normal size, in combination with a seed trough having its bottom perforated at intervals between which perforations said enlargements traverse.

In witness whereof I have hereunto set my hand this 30th day of August, 1892.

EDWIN DANIEL MEAD.

In presence of—
W. D. NORTON,
W. A. WHITE.